Nov. 22, 1955
P. I. HARR
2,724,185
APPARATUS FOR TESTING TUBING
Filed Nov. 29, 1952
4 Sheets-Sheet 1
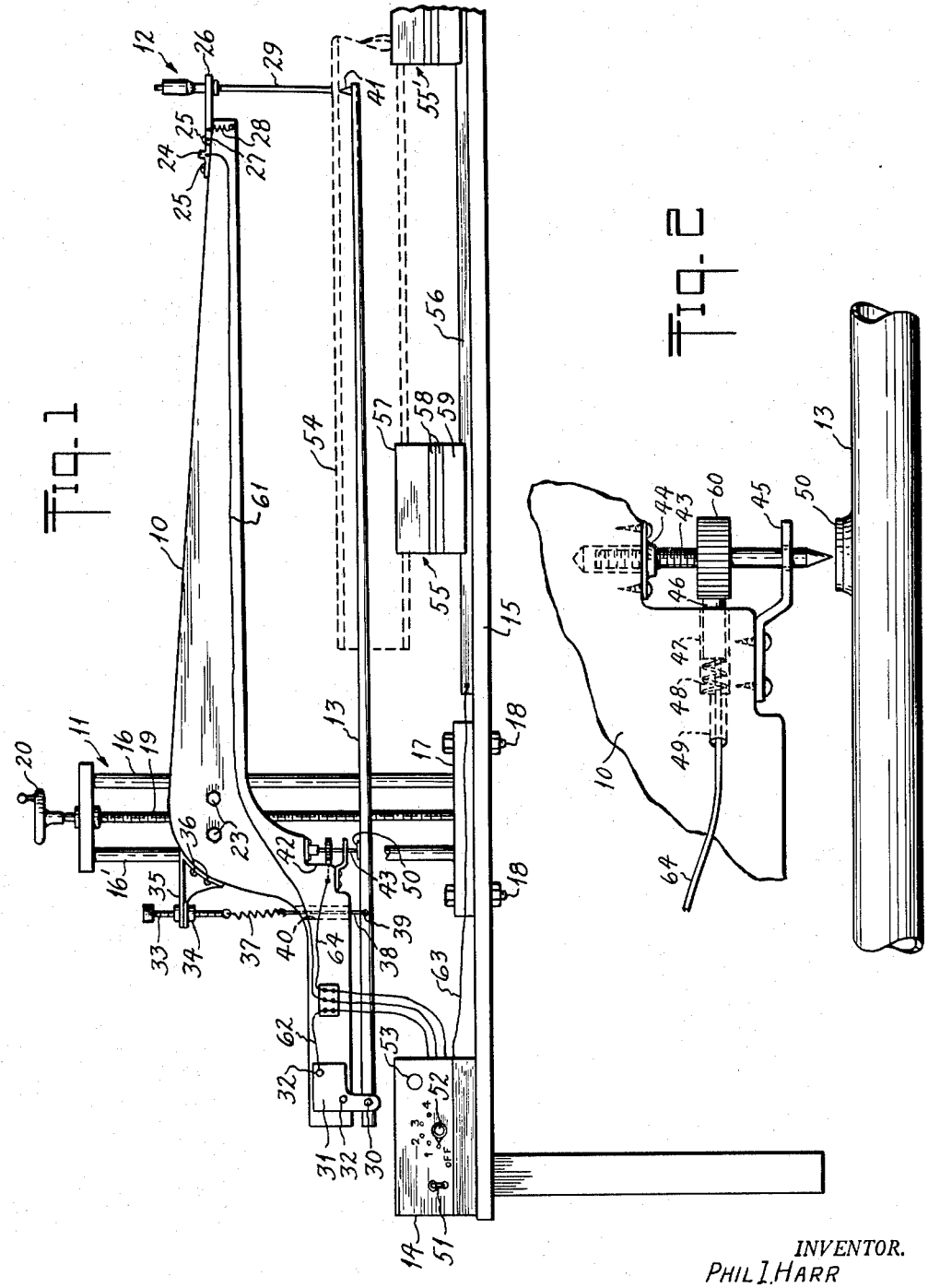
INVENTOR.
PHIL I. HARR
BY
*Campbell Brumbaugh Free & Graves*
HIS ATTORNEYS Nov. 22, 1955     P. I. HARR     2,724,185

APPARATUS FOR TESTING TUBING

Filed Nov. 29, 1952     4 Sheets-Sheet 2

INVENTOR.
PHIL I. HARR
BY
HIS ATTORNEYS

Nov. 22, 1955  P. I. HARR  2,724,185
APPARATUS FOR TESTING TUBING
Filed Nov. 29, 1952  4 Sheets-Sheet 3

INVENTOR.
PHIL I. HARR
BY
HIS ATTORNEYS

Nov. 22, 1955  P. I. HARR  2,724,185
APPARATUS FOR TESTING TUBING
Filed Nov. 29, 1952  4 Sheets-Sheet 4

INVENTOR.
PHIL I. HARR
BY
HIS ATTORNEYS

United States Patent Office 2,724,185
Patented Nov. 22, 1955

2,724,185

APPARATUS FOR TESTING TUBING

Phil I. Harr, Hagerstown, Md., assignor to Fairchild Engine and Airplane Corporation, Hagerstown, Md., a corporation of Maryland Application November 29, 1952, Serial No. 323,293

10 Claims. (Cl. 33—143)

This invention relates to apparatus for testing tubing, and has particular reference to apparatus for measuring the wall thickness of a tube at any of several locations along its length.

It has been extremely difficult to accurately measure the wall thickness of a tube at any location along its length other than at its immediate ends where a standard inside type micrometer is generally used to measure the wall thickness. However, the wall thickness is not necessarily a measure of the wall thickness throughout the length of the tube. In fact, experience demonstrates that end measurement is a most unreliable gauge of overall wall thickness, and where only one end of the tube is open, the averaging advantage of opposite end thickness measurement is not realized. Attempts to provide micrometers with long arms or probes to determine wall thickness intermediate the ends of a tube have generally been unsuccessful because of deflection of a long arm or probe, which will naturally deflect a certain amount because of its own unsupported weight as well as when measuring pressure is applied thereto, thereby resulting in measurements of uncertain accuracy. While the need for accurate measurement of tube wall thickness is by no means limited to aircraft use, the fact that aircraft utilize thin walled tubular structures to such a large extent because of the weight factor, and since even comparatively small variations in thickness of such highly loaded structural members may cause failure, the apparatus of the present invention is of particular advantage in the aeronautical field, not only for gauging structural members, but also for testing such items as a hollow propeller blade closed at one end, a stepped tube having a small access opening, and the like.

In accordance with the present invention, apparatus for accurately measuring the wall thickness of hollow metal bodies is provided which accurately checks the wall thickness thereof at any point along its length, including tubing having one end closed or tubing having either or both ends partially closed, and which also accurately gauges the concentricity of round tubing throughout its length.

In a preferred embodiment of the invention, an elongated pivoted probe arm extends parallel to an elongated micrometer head whose spindle is so positioned as to engage the outer surface of the test specimen opposite the point at which the probe on the probe arm engages the inner surface of the test specimen. Electrical contact is made between the micrometer spindle and the probe through the material of the test specimen to indicate that micrometer measurement of the actual wall material may be made. Prior to making the wall thickness reading, the initial level position of the probe arm is determined electrically by means of engagement between an electrical contact thereon and an adjustment contact point carried by the frame supporting the micrometer arm. Then the deflection of the probe and micrometer arms is compensated for by determining the deflection base micrometer reading when the spindle thereof and the probe are in electrical contact and pressure corresponding to measuring pressure. The specimen to be measured is then inserted between the retracted micrometer spindle and the probe and the micrometer measurement read when the probe, the wall of the specimen and micrometer spindle complete the electrical circuit which is indicated by a signal. The deflection base reading is then deducted from the wall thickness reading and the actual wall thickness of the test specimen thus obtained.

This measurement process may be repeated at any number of points along the length of the test specimen to obtain an accurate gauge of its overall wall thickness. By rotating the test specimen about its axis while the probe and spindle engage it, the concentricity of the inner and outer diameters of the specimen may be accurately gauged. The long gauge arms of the apparatus of this invention enable measurement of the wall thickness and concentricity of long tubes and other elongated hollow bodies having both or only one end open. In a modification affording a collapsible probe, the wall thickness of hollow bodies having only a small access opening may be measured with facility.

It will be seen that the electromechanical wall thickness measuring and checking apparatus of this invention is simple in construction and operation, and enables rapid and reliable determination of the strength of tubular or hollow members whose strength depends upon a minimum safe wall thickness at all points, and the like.

For a more complete understanding of the invention, reference may be had to the accompanying drawings, in which:

Figure 1 is an elevation of the wall thickness measuring and testing apparatus of this invention;

Fig. 2 is an enlargement of a portion of Fig. 1;

Figure 3:
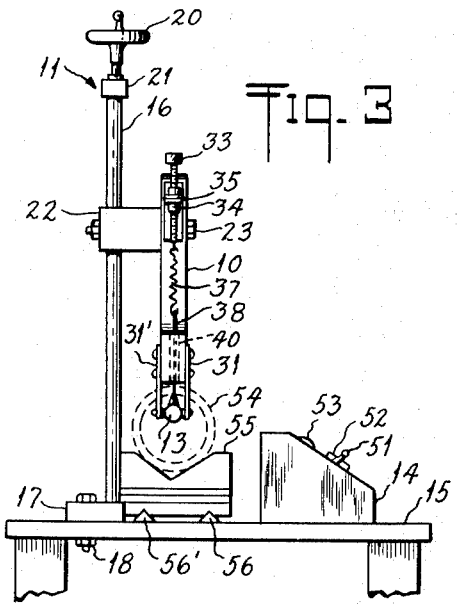
Fig. 3 is a side elevation of the apparatus of Fig. 1.

Referring to the drawings, the machine is composed basically of a frame 10 made of a suitable electrical non-conducting material such as "Masonite," a vertically adjustable support 11 carrying the frame 10, a micrometer assembly 12 on frame 10, a tapered tubular probe arm 13 carried by frame 10, an electronic unit 14, and a platform 15 which may be a table top on which the support 11 and the specimen to be tested are mounted.

As is best shown in Figs. 1 and 3, the support 11 consists preferably of a pair of parallel vertical rods 16, 16' rigidly mounted in a base 17 which is anchored to the platform 15 by bolts or other fastening members 18. A threaded rod 19, having a crank 20 secured to its upper end for manual rotation thereof, is journalled at its upper end in a cross piece 21 extending between the upper ends of the two vertical support rods 16, 16' and seated at its lower end in a socket in base 17. A travelling nut 22 is threaded on rod 19 and has a vertical opening through each side to receive and slide on the two vertical rods 16, 16'. Rotation of threaded rod 19 by crank 20 causes the travelling nut 22 to move up or down on the two vertical guide rods 16, 16'.

The frame 10 is mounted on the travelling nut 22 by bolts 23, to move therewith up or down the guide rods 16, 16' when crank 20 is rotated. The micrometer assembly 12 is supported by the movable portion of a hinge 26 pivoted about horizontal pin 27 on fixed hinge portion 24 secured to the free end of frame 10 by screws 25.

The micrometer assembly 12 as a whole is urged downwardly against the frame 10 by a coil spring 28 attached at one end to the hinge 26, and at the other end to the frame 10. The micrometer assembly 12 is provided with an elongated gauge spindle 29 which is moved axially as the micrometer head is adjusted.

The probe arm 13 is pivoted at one end about horizontal pin 30 mounted on bracket 31 secured by screws 32 to one end of frame 10. Probe arm 13 is maintained in a substantially horizontal position by a resilient adjustable support, comprising a thumbscrew 33 engaging a threaded bushing 34 carried by a bracket 35 attached to the frame 10 by screw 36, a coil spring 37 attached at one end to the thumbscrew 33 and at its other end to a wire or rod 38 passing through a vertical hole 40 in frame 10 and connected to the probe arm 13 at 39. A vertical probe or feeler 41 is provided at the extremity of the probe arm 13 opposite the micrometer spindle 29. It will be observed that the tip of probe or feeler 41 is sharply pointed in order to penetrate or break through any film or layer of scale, oil or other foreign matter that might overlie the inner surface of the test specimen. Thus, adequate single point electrical contact is insured between the probe or feeler 41 and the metal of the test specimen.

The lower surface of the frame 10 is recessed at 42 to accommodate an adjustable electrical contact device best shown in Fig. 2, and comprising a jackscrew 43 having a pointed tip at its lower end and threaded at its upper end in fixed bushing 44, which may be a standard anchor nut, a guide member 45 mounted on frame 10 and an electrical contact wiper 46 seated in recess 47 and urged against the knurled thumb wheel 60 by spring 48. The recess 47 in frame 10 is connected by a smaller angularly drilled hole 49 to receive wire 64, which is electrically connected to the wiper 46 and connects the latter and the jackscrew 43 into the electrical circuit to be described. The pointed tip of the adjustable jackscrew 43 is adapted to engage a contact plate 50 which is preferably polished to a perfectly flat, almost mirror-like surface for good electrical contact with the tip of the jackscrew 43 and is securely attached, as by welding or brazing, to the top of horizontal probe arm 13 so that the upper surface of plate 50 lies in a horizontal plane.

Figure 4:
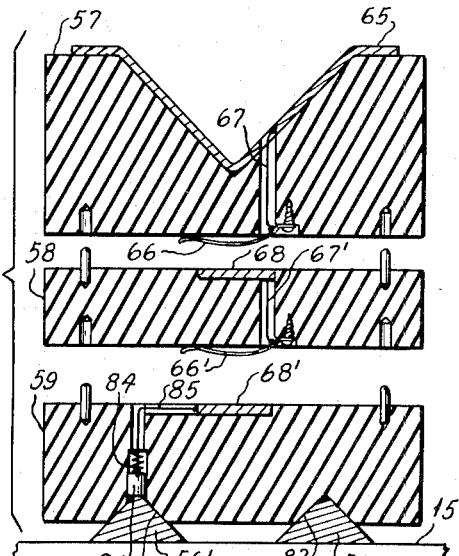
Fig. 4 is an enlarged section of one of the specimen V-blocks and illustrates the preferred means of providing electrical contact between component parts thereof.

The test specimen 54, indicated in phantom or broken lines in the drawings, is supported by a pair of V-notched saddle blocks 55 and 55' which rest on a pair of metal rails 56, 56', secured to the surface of platform 15 below the probe arm 13. These V blocks may be made of metal, but preferably are formed in complementary sections of non-conducting material like "Masonite," and comprise a top block 57, a base block 59 and one or more spacers or shims 58, of which one is shown in Fig. 4. A copper or brass plate 65 bent to V shape to match the contour of the top block 57 rests in the V slot thereof to make contact with the test specimen 54.

As shown especially in Fig. 4, the conducting plate 65 and block 57 are drilled for passage of a conductor wire 67, one end of which is soldered to the plate 65 and the other end is soldered to a contact spring of copper or brass 66 screwed to the bottom surface of the top block 57. The intermediate spacer block 58 is also drilled for the connector wire 67' soldered at its lower end to contact spring 66' and at its upper end to a copper or brass disc 68 recessed in the center of the top surface of the block 58 to make contact with the spring 66 when the blocks are mated together. The lower block 59 has disc 68' recessed in its upper surface to make contact with the strip 66 contacting spring 66' on the adjacent mating spacer block and has two parallel V-shaped notches cut in its lower surface to match the rails 56, 56', shown in Figs. 1, 3 and 4. Electrical contact is provided between the disc 68' and one of the rails by a wire 85 soldered at one end to the disc 68' and at the other end to a contact wiper 86 urged against the corresponding rail 56' by a coil compression spring 84, seated with wiper 86 in a bored hole intersecting the apex of the corresponding V slot 87.

The purpose of the multiple block construction shown in Fig. 4 is to allow accurate testing of specimens 54 which are not tubes of constant diameter throughout their lengths, as for instance, tapered tubes and stepped tubes. While it is not necessary that the tube be held exactly horizontally for checking the wall thickness at a given point, it is necessary that the longitudinal axis be horizontal when testing for concentricity of inside and outside diameters at a given point along the length of the tube. To accomplish this, additional spacers or shims 58 may be added or removed as required until the tube 54 is supported in a horizontal position.

A box 14 houses the necessary electronic equipment, and has on one face an off-on switch 51, a selector switch 52, and an indicator lamp 53. The jackscrew 43 shown enlarged in Fig. 2, is wired into the electronic circuit through wire 64, the micrometer assembly 12 through wire 61, the probe arm 13 through wire 62, and the guide tracks 56, 56', the V blocks 55, 55', and the test specimen 54 through wire 63.

Figure 5:
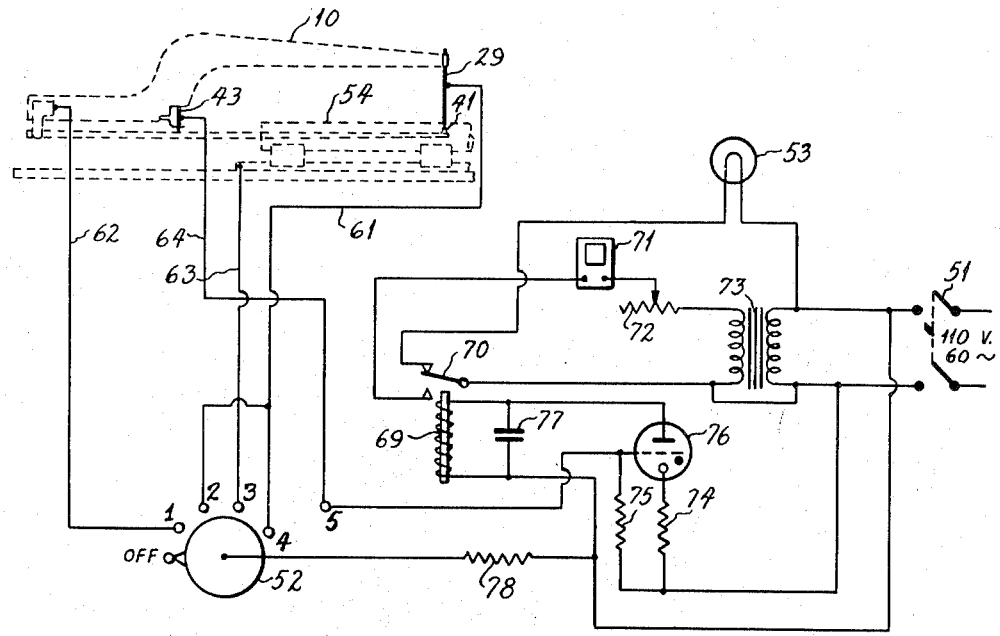
Fig. 5 is a wiring diagram of the electrical circuit of the apparatus.
Figure 6:
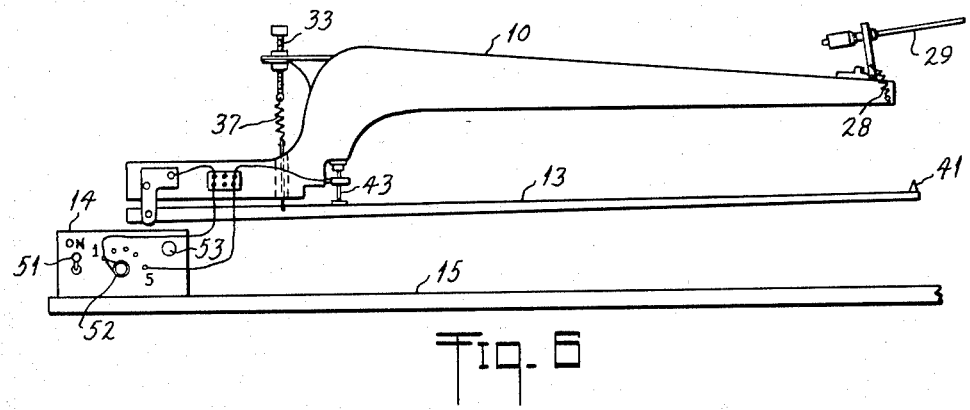
Figs. 6, 7, 8 and 9 are diagrams showing operative portions of the apparatus and circuit for different operating positions of the apparatus.

Referring now to the wiring diagram of Fig. 5, the lamp 53 and a buzzer 71 are energized from a source of 110 volt alternating line current, through a circuit containing a No. 1021 gas tube 76, the purpose of which is to provide the high degree of sensitivity desired in the system. A normally closed switch 70 in the lamp circuit is opened by a solenoid 69 which then closes the circuit to the buzzer 71 when contact is made through any one of the circuits shown in Figs. 6, 7, 8 or 9. The transformer 73 and the variable resistance 72 function to step down the line voltage and current to the correct amounts for operation of the buzzer. Resistances 74 and 75 are provided as required for proper firing of the tube 76. A condenser 77 is provided to prevent chatter of the solenoid-operated switch 70. A resistance 78 steps down the line voltage and current to the selector switch 52.

As shown particularly in Figs. 1 and 5, the wire 62 leading from the probe arm 13 is connected to terminal No. 1 of the selector 52, the wire 61 from the micrometer 12 is connected to selector terminals No. 2 and No. 4, the wire 63 from the tracks 56, 56' is connected to selector terminal No. 3, and wire 64 from the jackscrew 43 is connected to selector terminal No. 5.

In operation of the tube testing apparatus of this invention, the circuit is energized by closing the switch 51 and the selector 52 is moved to position No. 1. With micrometer spindle 29 swung out of the way, probe arm 13 is raised by applying a slight initial tension to the spring 37 by rotating the thumbscrew 33. The jackscrew 43 is turned until the pointed tip thereof makes contact with the plate 50 on probe arm 13, at which time the lamp 53 will be extinguished and the buzzer 71 will sound. This first step is shown schematically in Fig. 6.

Figure 7:
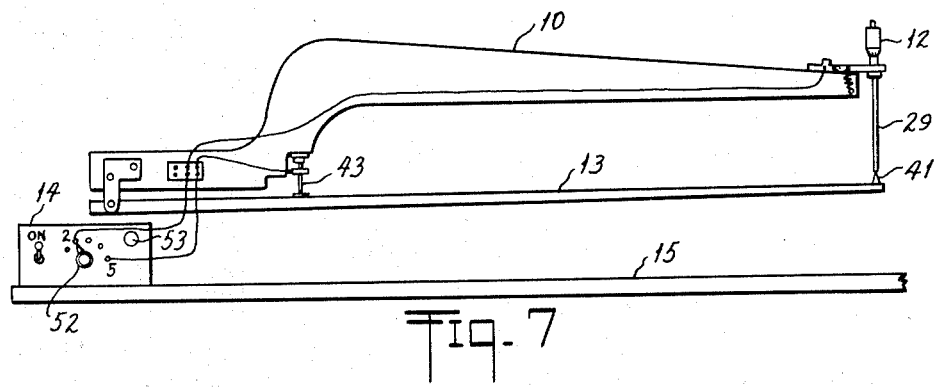
Figure 8:
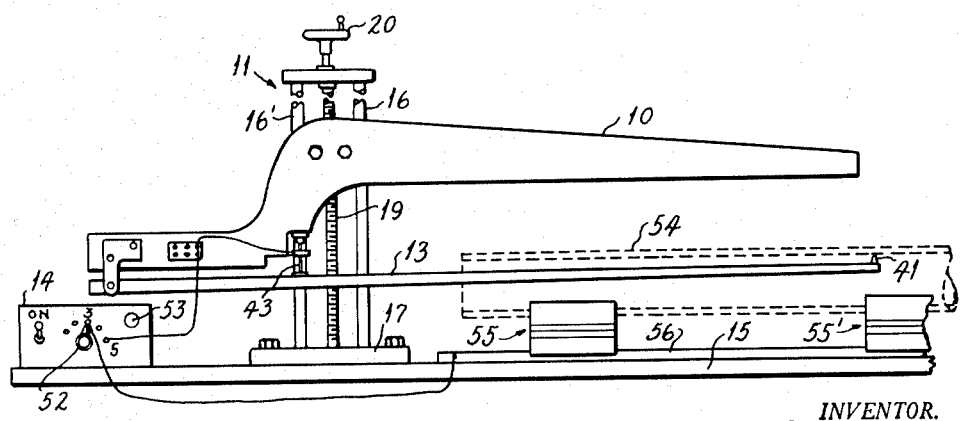

Selector switch 52 is next rotated to position No. 2, whereupon the buzzer stops and the lamp 53 lights. Micrometer head 12 is swung into vertical position and is adjusted by turning the thimble until the spindle 29 touches the probe 41 on the probe arm 13, which completes a circuit from terminal 5 (Fig. 5) through wire 64 to jackscrew contact 43 (Fig. 2), through probe arm 13, micrometer 12, and wire 61 to selector terminal No. 2 which reenergizes the buzzer 71 and extinguishes the lamp 53. This condition is shown in Fig. 7.

The micrometer spindle 29 is further extended very slowly until the circuit just established is broken, that is, when the point on the jackscrew 43 breaks contact with the plate 50 on probe arm 13, which is indicated by the stopping of the buzzer and the lighting of the lamp 53. Next, the micrometer spindle 29 is retracted until the contact between plate 50 and jackscrew 43 is again just barely completed which is indicated by the buzzer and the extinguishment of the lamp. This "feel" adjustment will be automatically acquired by the operator after short experience in the use of the machine. The above procedure establishes the point of contact between the micrometer spindle 29 and the probe 41 at a definite position in relation to the frame 10 and under a loading condition which can easily be reproduced. Thus, the deflection of the frame 10 and probe arm 13, due to their individual weights, will not affect the accuracy of the machine.

The machine is now in its basic setting and a reading is taken on the micrometer head 12 and recorded as the zero or deflection base reading. After recording the reading, the micrometer spindle 29 is retracted a sufficient distance to permit insertion of the specimen 54 to be tested between the probe 41 and spindle 29. The test specimen 54 rests on the two V blocks 55 and 55', which are then moved fore or aft to the desired position along the two rails 56, 56' or by axially sliding the tube 54 in the V blocks 55 and 55', or by a combination of both. When the desired point to be checked on the tube 54 has been positioned between probe 41 and spindle 29, the selector switch 52 is turned to position No. 3 and the crank 20 is turned to raise the entire frame 10 and probe arm 13 until the probe 41 of the probe arm 13 makes contact with the upper inside surface of the tube 54. This completes the circuit through the jackscrew 43, probe arm 13, tube 54, V blocks 55, 55', and rails 56, 56' and is indicated by the sounding of the buzzer 71, and is the condition shown in Fig. 8. Then the crank 20 is turned further to continue raising the probe arm 13 until the contact between the probe arm 13, block 50 and the jackscrew 43 is broken as indicated by the lighting of the lamp and stopping of the buzzer. This "feel" contact is repeated several times until the circuit is just barely completed, which places the machine in its base position again with probe 41 in the same relation to the frame 10 as it was when the selector switch was in position No. 2 for determining the zero or deflection base reading.

Figure 9:
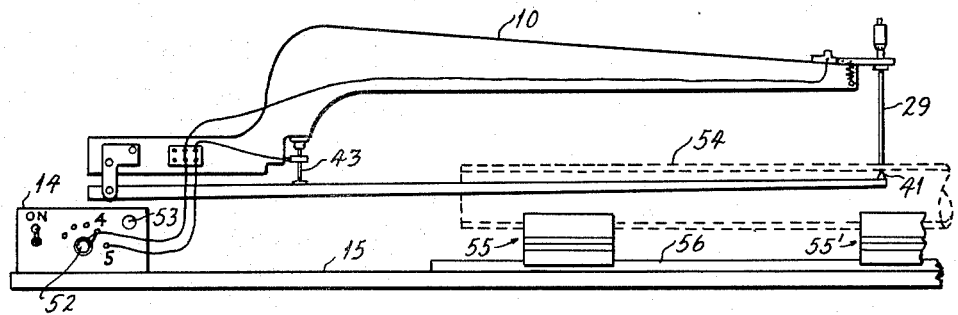

The selector switch 52 is next rotated to position No. 4 which closes the circuit to the indicator lamp 53, but not to the buzzer. The micrometer spindle 29 is advanced until it contacts the tube surface, which opens the circuit to the lamp and closes the circuit to the buzzer. This condition is shown in Fig. 9. The micrometer spindle 29 is slowly extended until the contact between the jackscrew 43 and the probe arm 13 is broken by slight deflection of the frame 10. The micrometer spindle 29 is slowly retracted until the contact is again just barely completed, which restores the frame 10 to the same relation to the probe 41 as it was in the zero or deflection base reading position when selector 52 was in position No. 2. A reading is now taken on the micrometer head 12 and recorded. The difference between this reading and the deflection base or zero reading previously recorded is the actual thickness of the wall of the tube specimen 54 at the point of measurement. A check of concentricity of the inside and outside diameters of round tubes may be made in selector position No. 4 by slowly rotating the tube and noting the audible and visual signals of the buzzer and lamp.

Figure 10:
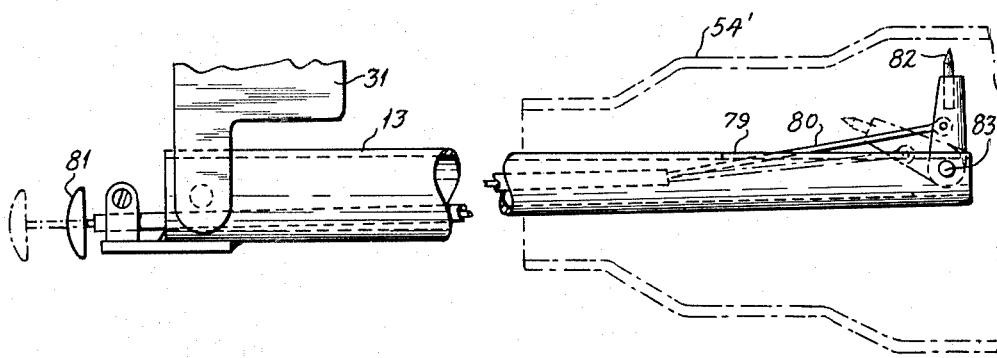
Fig. 10 illustrates a modification comprising a collapsible probe tip for use in testing tubes having partially closed ends.

Fig. 10 illustrates a modification wherein the probe arm 13 has been adapted to check tubes which have one or both ends partially closed, such as the stepped diameter tube 54' there shown. The top surface of the end of the probe arm 13 is slotted at 79 for passage of one end of a push-pull rod 80, which lies within the hollow probe arm 13 and extends to its large end for connection to a suitable knob 81. The push-pull rod 80 is connected to a collapsible probe 82 pivoted on a pin 83 extending through the end of probe arm 13. Thus, a pull on knob 81 retracts rod 80 and pulls the probe 82 down against the probe arm 13 as shown in dotted lines in Fig. 10, in order that it may be inserted in the small end opening of the specimen 54'. After insertion of the probe 82 to the larger diameter area of the specimen 54', the knob 81 is pushed to erect the probe 82 to its vertical or test position. Then the test procedure is carried out as described in connection with Figs. 6 to 9, inclusive, and the probe 82 is again collapsed to permit its withdrawal from the tube 54'.

Although the present disclosure is directed specifically to the use of an electronic means for signaling the make and break of circuits for sensitive readings, the use of such electronic circuits would not be necessary if the extreme degree of accuracy provided in this invention were not required. The deflection base or zero reading could be established visually by observing the instant of separation of the point of the jackscrew 43 and the probe arm 13, which would serve the purpose of allowing for the deflections previously mentioned. After the probe 41 has been inserted into the specimen to be tested, proper contact of the probe 41 with the inner surface of the specimen would also be determined by observing the separation of the jackscrew 43 and probe arm plate 50 and the final setting should be determined in the same manner. The invention is otherwise susceptible to changes in form and detail within the scope of the appended claims.

I claim:

1. In apparatus for checking the thickness of material, the combination of a base, a frame mounted on said base and comprising elongated upper and lower parts connected at one end and spaced apart at their free ends to form a throat, a micrometer head assembly comprising a thimble, a barrel, and a spindle mounted at the free end of said upper part, a probe on the free end of said lower part in alignment with said micrometer spindle, resilient means for urging said upper and lower parts together, jackscrew means for moving said upper part away from said lower part to vary the spacing between said spindle and said probe, electrical contact means interposed between said upper and lower parts and engageable and disengageable by relative movement said upper and lower parts, and an electrical signal responsive to engagement and disengagement of said contact means and to engagement of said probe and said spindle with said material and each other.

2. In apparatus for checking the thickness of material, the combination of a horizontal base, an adjustable vertical support member on said base, an elongated micrometer frame mounted on said support member and comprising upper and lower parts, a hinge connecting said parts together at one end and spaced apart at their free ends to form a throat, a micrometer head assembly comprising a thimble, a barrel, and a spindle mounted at the free end of said upper part opposite said throat, a micrometer probe on the free end of said lower part in axial alignment with said spindle, resilient means urging said upper and lower parts together, jackscrew means on said upper part bearing against said lower part for moving said lower part away from said upper part to vary the spacing between said spindle and said probe, electrical contact means interposed between said upper and lower parts and engageable and disengageable by relative movement between said upper and lower parts, and an electrical signal responsive to engagement and disengagement of said contact means and to engagement of said probe and said spindle with said material and each other.

3. In apparatus for checking the thickness of electrically conductive material, the combination of a base, a frame mounted on said base and comprising elongated upper and lower parts connected at one end and spaced apart at their free ends to form a throat, a micrometer head assembly comprising a thimble, a barrel, and a spindle mounted at the free end of said upper part, a probe on the free end of said lower part in alignment with said micrometer spindle, resilient means for urging said upper and lower parts together, jackscrew means for moving said upper part away from said lower part to vary the spacing between said spindle and said probe, electrical contact means interposed between said upper and lower parts and engageable and disengageable by relative movement between said upper and lower parts, and electrical signal means selectively responsive to engagement and disengagement of said contact means to completion of an electrical circuit between said spindle and probe through the material, and directly between said spindle and probe.

4. In apparatus for checking the thickness of electrically conductive material, the combination of a horizontal base, an adjustable vertical support member on said base, an elongated micrometer frame mounted on said support member and comprising upper and lower parts, a hinge connecting said parts together at one end and spaced apart at their free ends to form a throat, a micrometer head assembly comprising a thimble, a barrel, and a spindle mounted at the free end of said upper part opposite said throat, a micrometer probe on the free end of said lower part in axial alignment with said spindle, resilient means urging said upper and lower parts together, jackscrew means on said upper part bearing against said lower part for moving said lower part away from said upper part to vary the spacing between said spindle and said probe, electrical contact means interposed between said upper and lower parts and engageable and disengageable by relative movement between said upper and lower parts, said jackscrew means and said spindle being adjustable to engage and disengage said contact means, electric signal means responsive to engagement and disengagement of said contacts, said electrical signal means also being connected to said spindle and probe and responsive to completion of an electrical circuit between said spindle and probe through the material and directly between the spindle and probe.

5. In apparatus for checking the thickness of material, the combination of a base, a frame mounted on said base and comprising elongated upper and lower parts connected at one end and spaced apart at their free ends to form a throat, a micrometer head assembly comprising a thimble, a barrel, and a spindle mounted at the free end of said upper part, a probe on the free end of said lower part and having a sharp, pointed tip in alignment with said micrometer spindle, resilient means for urging said upper and lower parts together, jackscrew means for moving said upper part away from said lower part to vary the spacing between said spindle and said probe, electrical contact means interposed between said upper and lower parts and engageable and disengageable by relative movement between said upper and lower parts, said jackscrew means and said spindle being adjustable to engage and disengage said contact means, and an electrical signal energized by said contact means upon movement of said parts to a predetermined relative position determined by penetration of said probe tip of the surface of said material into electrical conductive contact with said material.

6. In apparatus for checking the thickness of material, the combination of a horizontal base, an adjustable vertical support member on said base, an elongated micrometer frame mounted on said support member and comprising upper and lower parts, a hinge connecting said parts together at one end and spaced apart at their free ends to form a throat, a micrometer head assembly comprising a thimble, a barrel, and a spindle mounted at the free end of said upper part opposite said throat, a micrometer probe on the free end of said lower part and having a sharp, pointed tip in axial alignment with said spindle, resilient means urging said upper and lower parts together, jackscrew means on said upper part bearing against said lower part for moving said lower part away from said upper part to vary the spacing between said spindle and said probe, electrical contact means interposed between said upper and lower parts and engageable and disengageable by relative movement between said upper and lower parts, said jackscrew means and said spindle being adjustable to engage and disengage said contact means, and an electrical signal energized by said contact means upon movement of said parts to a predetermined relative position determined by penetration of said probe tip of the surface of said material into electrical conductive contact with said material.

7. In apparatus for checking the thickness of an electrically conductive material, the combination of a horizontal base member, an elongated micrometer frame comprising an upper part of non-conductive material and a lower part of conductive material, a hinge connecting said parts together at one end and spaced apart at their free ends to form a throat, an adjustable vertical support member on said base member supporting said upper part, a micrometer head assembly composed of a thimble, a barrel, and a spindle mounted at the free end of said upper part opposite said throat, a probe on the free end of said lower part in axial alignment with said spindle, resilient means for urging the said parts together, jackscrew means on said upper part bearing against said lower part for moving said lower part away from said upper part, means for supporting the test material in the throat between said spindle and said probe, an electrical signaling means, means forming a first circuit connecting said electrical signaling means to said lower part and jackscrew means, means forming a second circuit connecting said electrical signaling means to said spindle and said jackscrew means, means forming a third circuit connecting said electrical signaling means to said test material and said jackscrew means, and switching means for selectively energizing said electrical signaling means through either said three circuits.

8. In apparatus for checking the thickness of an electrically conductive material, the combination of a horizontal base member, an elongated micrometer frame comprising an upper part of non-conductive material and a lower part of conductive material, a hinge connecting said parts together at one end and spaced apart at their free ends to form a throat, an adjustable vertical support member on said base member supporting said upper part, a micrometer head assembly composed of a thimble, a barrel, and a spindle mounted at the free end of said upper part opposite said throat, a probe on the free end of said lower part and having a sharp, pointed tip in axial alignment with said spindle, resilient means for urging the said parts together, jackscrew means on said upper part bearing against said lower part for moving said lower part away from said upper part, means for supporting the test material in the throat between said spindle and said probe, an electrical signaling means, means forming a first circuit connecting said electrical signaling means to said lower part and jackscrew means, means forming a second circuit connecting said electrical signaling means to said spindle and said jackscrew means, means forming a third circuit connecting said electrical signaling means to said test material and said jackscrew means, and switching means for selectively energizing said electrical signaling means through either said three circuits determined by penetration of said probe tip of the surface of said material into electrical conductive contact with said material.

9. In apparatus for checking the thickness of electrically conductive material, the combination of a horizontal base member, an elongated frame of non-conductive material, a vertical adjustable support on said base supporting said frame in a substantially horizontal position, an elongated probe arm of conductive material pivoted at one end to one end of said frame, a probe on the other end of said probe arm, a micrometer head assembly on the other end of said frame having its spindle in axial alignment with said probe, a jackscrew on said frame intermediate its ends, an adjustable spring means supporting said probe arm from said frame and urging said probe arm against said jackscrew, means for supporting the test material between said probe and spindle, means forming a normally closed electric lamp circuit, means forming a normally open audible signal circuit, a relay included in said lamp and audible signal circuits to simultaneously open said lamp circuit and close said audible signal circuit when energized, an electron discharge tube in said relay circuit, means forming a first probe circuit connecting said relay circuit to said jackscrew and said probe arm, means forming a second probe circuit connecting said relay circuit to said jackscrew and said micrometer spindle, means forming a third probe circuit connecting said relay circuit to said jackscrew and said test material, and switching means for selectively energizing said relay circuit alternatively through said first probe circuit, said second probe circuit or said third probe circuit.

10. In apparatus for checking the thickness of the wall of a tube of electrically conductive material, the combination of a base, a frame mounted on said base and comprising elongated upper and lower parts connected at one end and spaced apart at their free ends to form a throat, saddle members on said base for supporting said tube with the wall thereof inserted in said throat, a micrometer head assembly comprising a thimble, a barrel, and a spindle mounted at the free end of said upper part, a probe on the free end of said lower part in alignment with said micrometer spindle, resilient means for urging said upper and lower parts together, jackscrew means for moving said upper part away from said lower part to vary the spacing between said spindle and said probe, electrical contact means interposed between said upper and lower parts and engageable and disengageable by relative movement between said upper and lower parts, electric signal means responsive to engagement and disengagement of said contacts, said electrical signal also being connected to said spindle and probe and energized by said contact means upon movement of said parts to a predetermined relative position and by engagement of said spindle and probe with each other and with the wall of the tube.

References Cited in the file of this patent

UNITED STATES PATENTS

| | | |
|---|---|---|
| 611,391 | Pike | Sept. 27, 1898 |
| 1,124,784 | Monro | Jan. 12, 1915 |
| 1,405,285 | Church | Jan. 31, 1922 |
| 1,571,641 | Pratt | Feb. 2, 1926 |
| 2,339,720 | Smith | Nov. 9, 1948 |
| 2,453,306 | Davis | Nov. 9, 1948 |
| 2,553,474 | Gray | May 22, 1951 |
| 2,587,774 | Shack et al. | Mar. 4, 1952 |